UNITED STATES PATENT OFFICE.

ARCHIBALD K. LEE, OF GALVESTON, TEXAS, ASSIGNOR OF ONE-THIRD HIS RIGHT TO JAMES R. McCLINTOCK.

IMPROVEMENT IN PROCESSES OF REDUCING ASPHALTUM TO A LIQUID.

Specification forming part of Letters Patent No. 162,394, dated April 20, 1875; application filed March 3, 1875.

*To all whom it may concern:*

Be it known that I, ARCHIBALD K. LEE, of the city and county of Galveston and State of Texas, have invented an Improved Process for Reducing Asphaltum to a Fluid, of which the following is a full, clear, and exact description.

The object of my present improvement is to reduce asphaltum to a liquid, and hold the same in a semi-fluid condition without heat, and which constitutes an entirely new article of commerce, and furnishes to the trade an article of asphaltum prepared and ready for use, without the labor, expense, and delay of melting, for paving and roofing purposes, and one most admirably adapted for use by manufacturers of varnish and japan.

The nature of my invention consists in the process hereinafter described, by which I am enabled to reduce asphaltum to a liquid, and to hold the same in a semi-fluid condition without heat, but simply through the action of a rectified concentrated anhydrous product or oil of turpentine, which I obtain from the redistillation of the spirits of turpentine of commerce.

The description and operation of my invention are as follows:

I take the spirits of turpentine of commerce and in an ordinary alcohol still revaporize the same. The vapor as rapidly as generated is caused to pass through an apparatus similar to that used in connection with alcohol-stills, and consists of a column, goose, and condensing-worm, for the purpose of freeing the turpentine as far as possible from water, acids, and other impurities, which may have been carried off or brought over from the still during the process of its former distillation. After this step in the redistillation of the turpentine is completed, practical experience has demonstrated the fact that some condensed steam, impregnated with acid and a resinous substance, yet remains in the distillate, and which it is essentially necessary should be entirely eliminated or thrown off before it is possible to obtain the perfect anhydrous product which I desire to use in reducing the asphaltum to a fluid. I therefore cause the distillate, after it has passed through the column, goose, and condensing-worm, to enter a separating vessel provided with a discharge-tube at its upper section for the turpentine to pass out, and another discharge-tube at its lower section for drawing off the water, acids, and resinous substance, and whose specific gravity being greater than that of the turpentine, have been separated from the turpentine in the vessel, and have fallen to the bottom of the same. The turpentine then passes to an apparatus consisting of a rectifying-tub packed or charged with equal parts of animal and vegetable charcoal, and caused to pass through said composition, and where the perfect and entire separation of all the condensed steam, acids, and resinous substance which may yet remain is effected; and the result is that a product is obtained which is a concentrated rectified anhydrous oil of turpentine.

Having thus treated the turpentine to obtain this product which I desire to use in reducing the asphaltum to a fluid, and the retaining of the same in a semi-fluid condition, I now take the crude asphaltum, either Trinidad or Cuban, and pulverize or reduce the same to a coarse or fine powder, and then place it in a suitable vessel and pour in the oil obtained from the spirits of turpentine, as hereinbefore described. The mass is then agitated or stirred by any suitable means, and the asphaltum is rapidly dissolved, the oil readily taking up from four to eight times its quantity, according to the use in connection with which the asphaltum is to be employed, and consequently the degree of consistency required.

The fluid asphaltum thus obtained can readily be barreled and transported, and is ready for use without being heated, or any heat whatever having been used in the producing of the fluid asphaltum, and, as such, is an article now entirely unknown to commerce.

Independent of the great advantage arising from the fact that by my process I am enabled to hold the asphaltum in fluid—something that has never hitherto been essayed—there is a yet greater advantage in the fact that the asphaltum is reduced by my process to a fluid or liquid condition without heat. All who are familiar with the reducing of asphaltum to a liquid for use in either varnish or japan manufactures, or as an ingredient in the construction of pavements, roofing compositions, &c., are aware of the intense heat which is required to melt the same, and which soon destroys the kettles, and thus renders the process very expensive. But this is not the greatest objection to the present system of melting asphaltum. Heat alone is not sufficient: dead oils have to be added, and which contain acids which are pernicious; and, besides, (and this is the greatest objection,) the intense heat burns out many of the most valuable properties of the asphaltum, while with my process all are retained and held.

What I claim as new, and desire to secure by Letters Patent of the United States, is—

The herein-described process of reducing asphaltum to a liquid, and holding the same in a fluid condition without heat or the use of dead oils, but through the action alone of a product obtained by the redistillation of the spirits of turpentine, and in then separating from the same the water, acids, and all resinous substances, and in then concentrating and rectifying the same, substantially as and for the purpose specified.

In testimony whereof I have signed my name to this specification in the presence of two subscribing witnesses.

ARCHIBALD K. LEE.

Witnesses:
JOS. T. K. PLANT,
EDWIN JAMES.